United States Patent
Forstmann

(10) Patent No.: US 7,836,070 B2
(45) Date of Patent: Nov. 16, 2010

(54) AUTOMATIC EVENT REGISTRATION DURING QUERY EXECUTION

(75) Inventor: Gerd Forstmann, Schubertstrasse (DE)

(73) Assignee: SAP AG, Walldorf (DE)

( * ) Notice: Subject to any disclaimer, the term of this patent is extended or adjusted under 35 U.S.C. 154(b) by 306 days.

(21) Appl. No.: 11/799,330

(22) Filed: Apr. 30, 2007

(65) Prior Publication Data

US 2008/0270348 A1    Oct. 30, 2008

(51) Int. Cl.
G06F 17/30    (2006.01)

(52) U.S. Cl. .................... 707/769; 707/771; 707/779

(58) Field of Classification Search .............. 707/3, 707/10, 706, 769, 770
See application file for complete search history.

(56) References Cited

U.S. PATENT DOCUMENTS

| 7,051,032 | B2 * | 5/2006 | Chu-Carroll et al. | 707/100 |
| 2004/0267769 | A1 | 12/2004 | Galindo-Legaria et al. | |
| 2005/0055381 | A1 | 3/2005 | Ganesh et al. | |
| 2006/0190355 | A1 | 8/2006 | Jammes et al. | |
| 2006/0230044 | A1 * | 10/2006 | Utiger | 707/10 |
| 2009/0099824 | A1 * | 4/2009 | Falash et al. | 703/8 |

FOREIGN PATENT DOCUMENTS

EP    1462958    9/2004

OTHER PUBLICATIONS

Kiernan et al., "Supporting deductive and active rules on top of a relational dbms", Inria Rapports de Recherche N 1580, [Online], Jan. 1992; Retrieved from the Internet: <URL:http://hal.inria.fr/docs/00/07/49/80/PDF/RR-1580.pdf> [Retrieved on Dec. 10, 2009].
Patron et al., "Active Database Systems", ACM Computing Surveys, [Online], vol. 31, No. 1, Mar. 1999, Retrieved from the Internet: <URL:portal.acm.org/citation.cfm?id=311623> [Retrieved on Dec. 19, 2009].

* cited by examiner

*Primary Examiner*—Baoquoc N To
(74) *Attorney, Agent, or Firm*—Mintz, Levin, Cohn, Ferris, Glovsky & Popeo, P.C.

(57) ABSTRACT

In one aspect, a computer-implemented method may provide evaluation of a query based on query-specific event handlers. The method may include receiving a query. Moreover, one or more objects and aspects of the objects may be determined based on the received query. The objects and aspects may be registered with event handlers to monitor the objects and aspects. The received query may be evaluated, when at least one of the event handlers indicates a change to at least one of the objects and the aspects. Other event handlers may be registered, when at least one of the event handlers indicates the change. Related systems, apparatus, methods, and/or articles are also described.

18 Claims, 5 Drawing Sheets

AUTOMATIC EVENT REGISTRATION DURING QUERY EXECUTION

FIELD

This disclosure relates generally to data processing, and, more particularly, to handling events associated with a query.

BACKGROUND

When a user interacts with a computer program, such as an application, Web service, or service, a user interface enables the user to interact with the program and receive information from that program. However, in some cases, the user interface may present data to a user that has been changed. For example, a user interface may query a database, receive the result of the query, and then present the result to a user. Since the database may be capable of being accessed and modified by other users and systems, the user may not be viewing a result that is current.

One solution to the above-noted problem is to update the user interface whenever any change occurs to the data in the queried system, such as a database. Although this approach may address the noted problem, it may not be practical when the data in the database is voluminous and undergoes frequent changes. As a consequence, there continues to be a need to provide user interfaces with updated information.

SUMMARY

The subject matter disclosed herein provides methods and apparatus, including computer program products, for evaluating a query based on a query-specific event handler to provide, in some cases, updated query results to a user interface.

In one aspect, in a computer-implemented method, a query may be received. One or more objects and aspects of the objects may be determined based on the received query. The objects and aspects may be registered with event handlers to monitor the objects and aspects. The received query may be evaluated, when at least one of the event handlers indicates a change to at least one of the objects and the aspects. Other event handlers may be registered, when at least one of the event handlers indicates the change.

In some variations, the computer-implemented method may also include receiving the query as a message and implementing the query using SQL (Structured Query Language) or XQuery. The objects may be implemented as business objects. The objects and aspects may be determined by identifying one or more of the following: a business object, an association among business objects, and an attribute of the business object. The one or more event handlers may be registered at a server receiving the query. The server may include the business objects. Each of the objects and aspects may be registered using a corresponding event handler as a callback interface at a repository including the objects. The one or more event handlers may be discarded, when at least one of the event handlers indicates a change. The indication that there is a change may include making a call to the user interface to resend the query. The result of the received query may be provided to a user interface.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

In some implementations, the subject matter described herein may be implemented to realize the advantage of providing a user interface with updated query results. Moreover, in some implementations, the subject matter herein may reduce the bandwidth used when communicating between a user interface and a server hosting data being queried.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
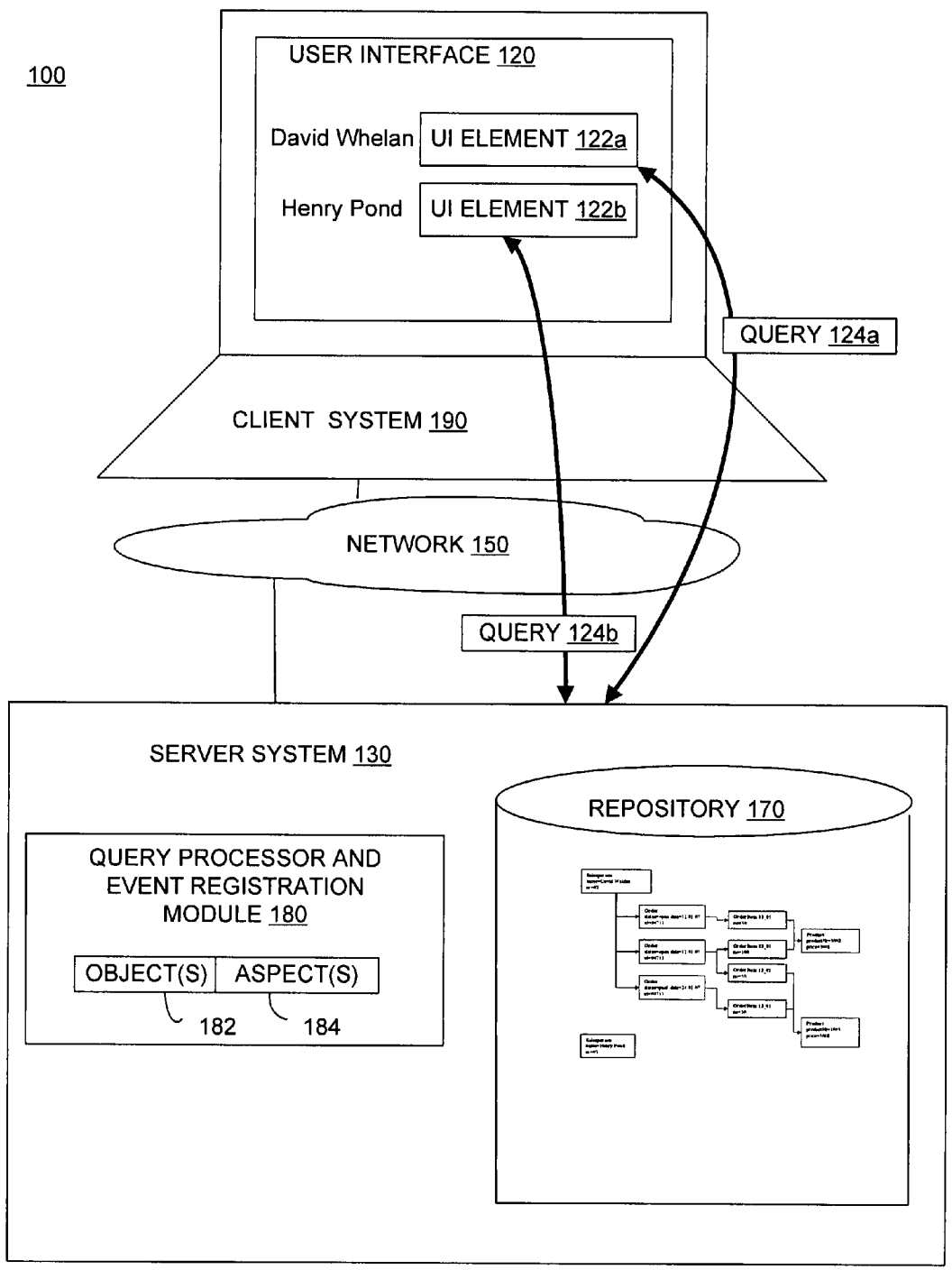
FIG. 1 illustrates a system for registering event handlers specific to a query to enable evaluation of the query based on at least one of the query-specific event handlers.

FIG. 1 depicts an exemplary system 100 for registering event handlers specific to a query to enable evaluation of the query, when at least one of the query-specific event handlers are triggered. The result of the query may be provided to a user interface to enable the user interface to update the presentation of the result.

The system 100 includes a client system 190 coupled to a server system 130 through a network 150 (e.g., the Internet or an intranet). The client system 190 and server system 130 may be implemented as a processor, such as a computer, server, and the like.

The client system 190 further includes one or more applications, such as a user interface 120. The user interface 120 may be any application used to interface with other applications, such as programs, services, Web services, and the like. For example, the user interface 120 may include a browser or client application to interface with applications at server system 130. In some implementations, user interface 120 is implemented as a small application, such as an applet or a Widget, i.e., a JavaScript runtime engine combined with an XML document structure that runs small applications, which can be stored in a repository or any other storage mechanism.

The user interface (UI) 120 may include one or more elements 122a-b (labeled "UI elements"). UI elements 122a-b refer to portions of a user interface, such as a field, a table, a button, a tool bar, and the like. When a user interface is designed, it may be designed by combining various UI elements. Moreover, a UI element may be associated with a query. For example, UI element 122a may correspond to the sum of all sales by a salesperson, David Walden. User interface 120 may determine that sum by querying server system 130 and repository 170. In this example, UI element 122a may have an associated query 124a. The query 124a determines a result for presentation at UI element 122a based on the business objects of repository 170. Returning to the previous example, query 124a may determine the result (e.g., the sum), which may be presented by user interface 120 to a user. Likewise, UI element 122b may have an associated query 124b of repository 170 and receive a result (e.g., Henry Pond's sum), which may be presented by user interface 120 to a user.

The server system 130 includes a repository 170 including structured data, such as objects, business objects, and the like. The server system 130 further includes a query processor and event registration module 180 (referred to herein as "query processor" for short).

The query processor 180 may process queries (e.g., queries 124a-b) from user interface 120 to determine a result, which can be returned to client system 190, user interface 120, and UI elements 122a-b. The queries 124a-b may be implemented as a command (e.g., SQL, X-Query, metamodel query language, or the like) to query a database, XML-document, or metamodel to determine a result based on data stored in repository 170. Returning to the above example, query 124a may be implemented as one or more SQL commands to evaluate business objects in repository 170.

The query processor 180 may also parse queries to determine query-specific event handlers based on objects 182 (e.g., business objects or other forms of structured data) and to determine aspects 184 associated with the objects. The term "object" refers to a data structure including at least one of data and related methods, while the phrase "business object" refers to an object used in connection with a business process or task. The so-called "aspects" of the object (or business object) include at least one of associations and attributes. An association refers to a linkage or relationship between objects, such as business objects. An attribute refers to a feature or a data value of an object, such as a business object.

Figure 2:
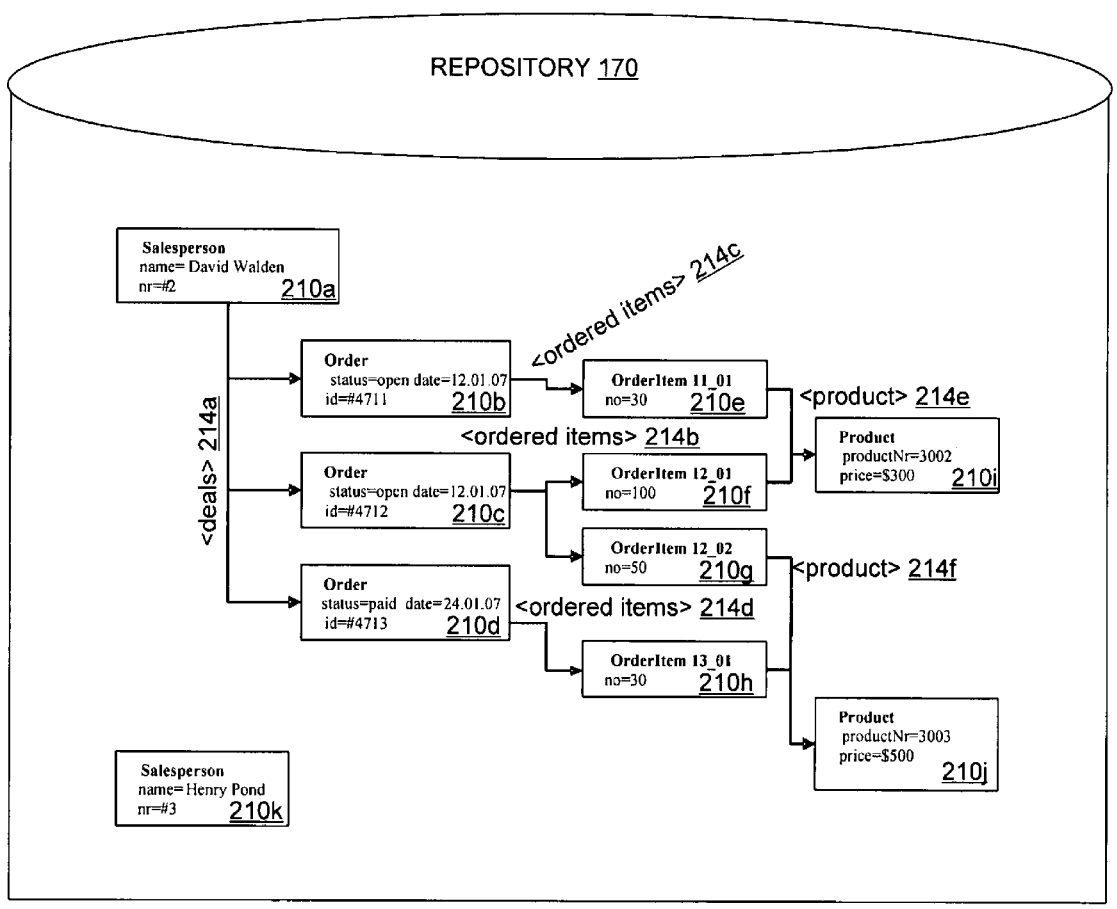
FIG. 2 illustrates a repository including data queried by the user interface.

FIG. 2 depicts examples of business objects 210a-k stored in repository 170. In some implementations, business objects 210a-k may be associated with an application, such as a Web service, service, database, XML-documents, metamodels, and the like. Moreover, when a client system 190 queries business objects 210a-k, server system 130 may create an instance of business objects 210a-k to respond to the query. Although the description herein refers to a business object, an object (e.g., structured data) may be used as well. In some implementations, the business objects 210a-k including associations and attributes form a metamodel (which can be queried), although other data structures may be used as well.

Business object 210a corresponds to a salesperson, David Walden, and includes attributes of "name=David Walden" and a salesperson identifier of "nr=#2." Business object 210a also includes associations, namely deals 214a (labeled "<deals>"), which associate business object 210a to business objects 210b-d corresponding to "orders."

The order business objects 210b-d include attributes, such as status information (e.g., "open date," "closed date," and "paid date") as well as a sales order identifier (labeled "id"). Order business objects 210b-d also include associations ordered items 214b-c (labeled "<ordered items>"), which associate the order business objects 210b-d to corresponding order items 210e-h.

The order items business objects 210e-h also include attributes, such as quantity of ordered items (labeled "no"). The associations product 214e-f (labeled "<product>") associate the order item business objects 210e-h to product business objects 210i-j. Product business objects 210i-j include attributes, such as product number (labeled "productNr") and a product price (e.g., $300). Repository 170 also includes business object 210k for a salesperson, Henry Pond, with attributes of name (e.g., Henry Pond) and a salesperson identifier of "nr=#3."

Figure 3:
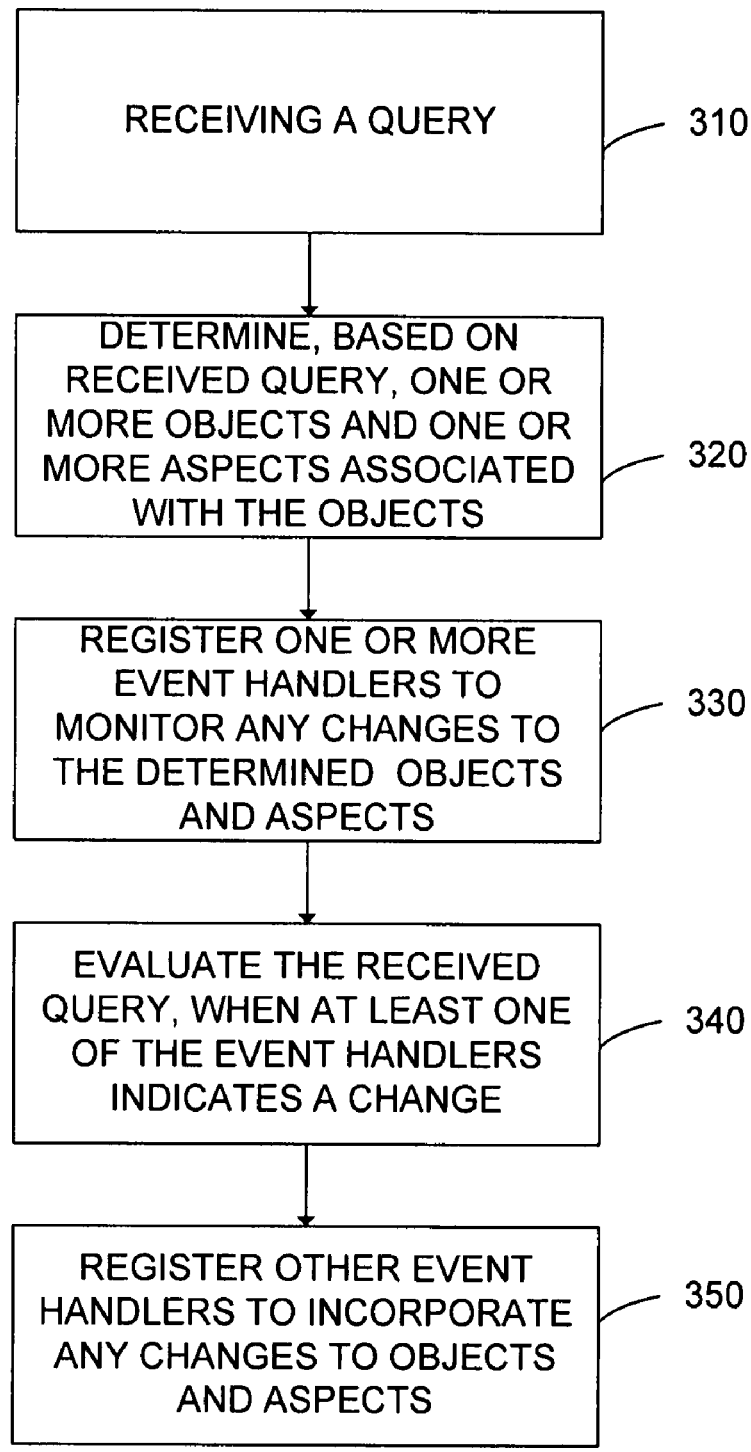
FIG. 3 illustrates a process for registering event handlers specific to a query.

FIG. 3 depicts a process for registering events specific to a query to enable evaluation of the query, when a query-specific event handler is triggered.

At 310, query processor 180 may receive a query, such as query 124a, from user interface 120. Query 124a may be associated with UI element 122a. For example, query 124a may correspond to a field representative of the total number of deals that a sales person has closed. The query 124a may determine the sum of those deals and return the result (e.g., the sum) to UI element 122a. In one implementation, query 124a is implemented as the following command:

SUM(SalesPerson/<deals>::Order[@date>=1.1.2007 and status="paid"]/<orderItems>::OrderItems/(<Product>/@price*@nr)) [Command 1], wherein the symbol "@" represents an attribute of a business object, and the symbol "< >" represents an association between business objects.

For a particular salesperson (e.g., David Walden associated with sales person business object 210a), Command 1 above would evaluate <deals> 214a associated with salesperson business object 210a. The associated deals, namely order business objects 210b-d, are included in the SUM query command if the attribute "date" is greater than or equal to "1.1.2007" and the attribute is "paid." Given the foregoing attributes and the business objects of FIG. 2, the associated order items (in this example, order item 210h) are then evaluated to determine quantity of products ordered (e.g., "no.=30") and price (e.g., "$500") of product business object 210j. In the example of FIG. 2, the query 124a would be processed by query processor 180 to determine the result as a SUM of $15,000 (e.g., 30 items×$500).

Moreover, the above query command may be implemented as query 124b of repository 170 to determine the SUM for other salespersons, such as salesperson business object 210k corresponding to Henry Pond. In the example of FIG. 2, the above query command would return a result (e.g., to UI element 122b via query 124b) of $0 since Henry Pond has no associated deals.

In some implementations, the query is received at 310 as a message, such as a SOAP message, although other messaging and call mechanisms may be used as well. Although the example described herein provides an example query and an example repository 170 including business objects, other types of queries and structured data may be used as well. Moreover, the message may include the query implemented as SQL or XQuery, although other types of queries may be used as well.

At 320, query processor 180 determines, based on the received query, one or more objects and one or more aspects (e.g., associations and attributes) of the objects. Query processor 180 may determine the objects and aspects by identifying all of the objects and aspects (e.g., business objects, associations, and attributes) in the query by parsing the query. For example, parsing may identify the objects and aspects using Command 1 above.

Returning to the above example of query 124a implementing the foregoing query command, business objects 210a-j are determined from the query as well as aspects, such as attributes (e.g., data, status, and the like) and associations 214a-f. Table 1 below depicts such a parsing of the query for salesperson business objects 210a-j.

TABLE 1

| Object | Aspects |
|---|---|
| David Walden | association <deals> |
| Order #4711 | attribute @date |
| Order #4711 | attribute @status |
| Order #4712 | attribute @date |
| Order #4712 | attribute @status |
| OrderItem 12_01 | attribute @no |
| OrderItem 12_01 | association <orderedProduct> |
| Product Nr 3002 | attribute @price |
| OrderItem 12_02 | attribute @no |
| OrderItem 12_02 | association <orderedProduct> |
| Product Nr 3003 | attribute @price |
| Order #4713 | attribute @status |
| Order #4713 | association <orderedItems> |
| OrderItem 13_01 | attribute @no |
| OrderItem 13_01 | association <orderedProduct> |
| Product Nr 3003 | attribute @price |

Table 2 below depicts such a parsing for salesperson business object 210k (labeled Henry Pond).

TABLE 2

| Object | Aspects |
|---|---|
| Henry Pond | association <deals> |

At 330, query processor 180 registers event handlers for the objects and aspects determined at 320. For example, the objects and aspects listed in Table 1 above may be used to register query-specific event handlers. An event handler is a callback subroutine that handles inputs received in a program. For example, events can represent availability of new data (e.g., a change in status for one of the objects and/or aspects of Tables 1 and 2 may trigger the event handler). In some implementations, the event handlers are invoked by repository 170 based on any detected changes.

The registered event handlers may detect changes. For example, since an event handler monitors the association <deals>, any new deals, deleted deals, or moved (e.g., attributed to another salesperson) would be detected—triggering thus the event handler. Similarly, since an event handler monitors the attribute @date, a change of "date," such as a change into or out of the relevant date range, would be detected.

The event handlers described herein may be determined on a query-specific basis, i.e., the objects and aspects specific to a query are used to establish event handlers, so that if a change occurs that is specific to the query, the result for only the affected query is updated at one of the UI elements. For example, if a new deal is added to one of the salesperson business objects, the event handler for associations <deals> 214a would be triggered, i.e., detect the change and send a message notifying query processor 180. Without the query-specific event handler, a change to an object or aspect may require reevaluating all queries associated with a repository and updating all of the UI elements at a user interface, which may unnecessarily consume time, bandwidth, and processing resources by reevaluating queries and results that do not need to be reevaluated.

Although user interface 120 is depicted as including only two UI elements, user interface 120 may include more or fewer UI elements. Moreover, although repository 170 is depicted as including business objects 210a-k, repository 170 may include more or fewer business objects and other forms of data as well.

At 340, when at least one of the event handlers is triggered by a change to an object or an aspect, query processor 180 updates the results for queries 124a-b by evaluating (e.g., reevaluating) the query received in 310 by performing a query command, such as Command 1 above. In some implementations, query processor 180 notifies user interface 120 to resend the affected query to repository 170, so that query processor 180 can process the query.

At 350, when the event handler is triggered, query processor 180 also registers other event handlers associated with any of the changes detected by the event handlers. Since a triggered event handler represents a change to the state of the business objects and/or aspects of the business objects, new (or updated) event handlers may need to be determined and thus registered. In some implementations, query processor 180 may also discard any previous event handlers at 350, after registering the other event handlers.

Figure 4:
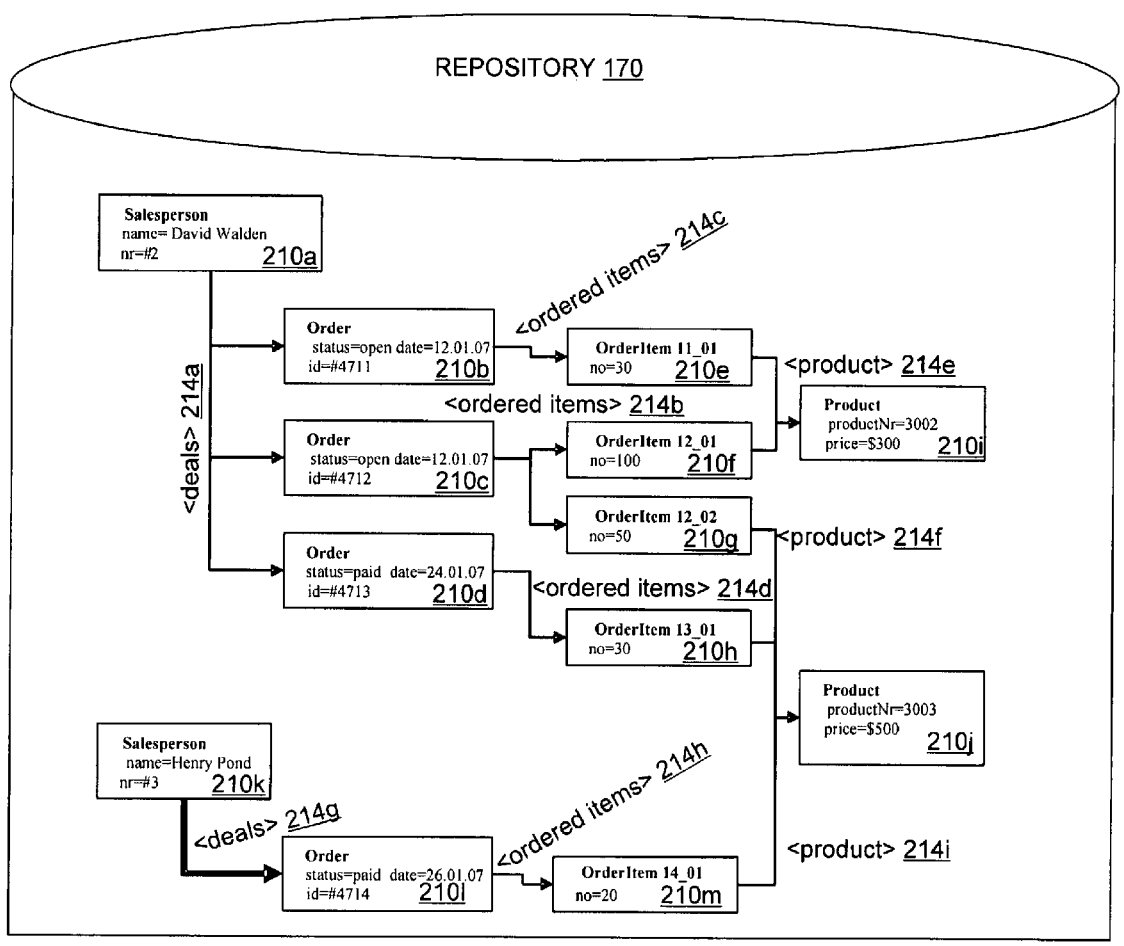
FIG. 4 illustrates a repository including data queried by the user interface.

FIG. 4 depicts an example of a new order, namely order business object 210l, being associated to Henry Pond using salesperson business object 210k and deals 214g. The association order items 214h and product 214i further associate order business object 210l with order items business object 210m and product business object 210j.

At 340, when order business object 210l is added, the event handlers for "association <deals>" (Table 2 above) are triggered. In some implementations, query processor 180 sends a message to user interface 120 to resend the affected query 124b, while in other implementations query processor 180 retrieves a locally saved copy of the query 124b. For example, query 124b may be implemented as a query, such as query Command 1 above.

In any case, query processor 180 determines an updated result for query 124b. A reevaluation of query 124b would result in a SUM of $10,000 (20×$500), which may be sent to UI element 122b for presentation.

In some implementations, query processor 180 may not implement the entire query command. Instead, it may only recalculate a portion of the query command. For example, if the price of product business object 210j changed from "$500" to "$250," query processor 180 may only reevaluate a portion (e.g., (<Product>/@price*@nr)) of the query.

At 350, query processor 180 may also register other event handlers to incorporate the changes to the objects and aspects. For example, Table 3 below depicts the new objects and aspects for salesperson business object 210k (Henry Pond), registered as updated event handlers for the business objects 210j-m.

TABLE 3

| Object | ASPECTS |
|---|---|
| Henry Pond | association <deals> |
| Order #4714 | attribute @date |
| Order #4714 | attribute @status |
| OrderItem 14_01 | attribute @no |
| OrderItem 14_01 | association <orderedProduct> |
| Product Nr 3003 | attribute @price |

At 350, query processor 180 may also deregister (or discard) the previous event handlers associated with Table 2 above.

Figure 5:
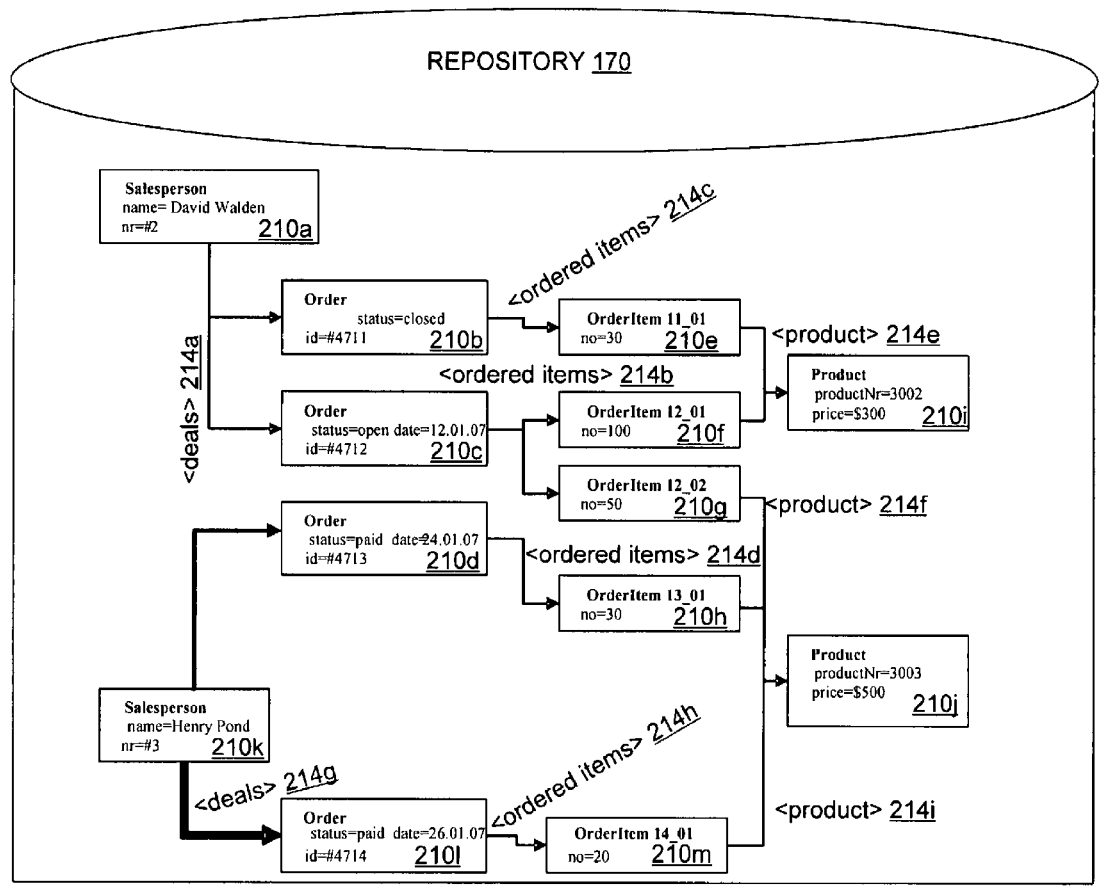
FIG. 5 illustrates a repository including data queried by the user interface.

FIG. 5 depicts an example of order business object 210b changing attribute from "open" to "closed." That attribute was monitored by an event handler (see Table 1 at "Order #4711" and "attribute @status"). FIG. 5 also depicts an assignment change of business object 210d from David Walden to Henry Pond. That attribute was also monitored by an event handler (see Table 3 at "Henry Pond" and "association <deals>"). When event handlers detect changes, the event handlers may notify user interface 120. At 340, the query processor 180 may evaluate the received queries 124a-b, which may be implemented using Command 1 above.

In some implementations, query processor 180 sends a message to user interface 120 to resend the affected queries 124a-b, while in other implementations query processor 180 retrieves a locally saved copy (e.g., saved at server 130) of the queries 124a-b.

A reevaluation of query 124a would result in a SUM of $64,000 (0×$300+100×$300+50×$500), while reevaluation of query 124b would result in a SUM of $25,000 (30×500$+ 20×500$). Query processor 180 would provide the results of the queries 124a-b to user interface 120 and UI elements 122a-b.

At 350, query processor 180 may also register other event handlers to incorporate the changes to the objects and aspects. For example, Tables 4 and 5 below depict the new objects and aspects, namely order business object 210b changing attribute from "open" to "closed" and an assignment change of business object 210d from David Walden to Henry Pond. Tables 4 and 5 correspond to the updated event handlers.

At 350, query processor 180 may also deregister (or discard) the previous event handlers associated with Tables 1 and 3 above.

TABLE 4

| Object | ASPECTS |
|---|---|
| David Walden | association <deals> |
| Order #4711 | attribute @date |
| Order #4711 | attribute @status |
| Order #4712 | attribute @date |
| Order #4712 | attribute @status |
| OrderItem 12_01 | attribute @no |
| OrderItem 12_01 | association <orderedProduct> |
| Product Nr 3002 | attribute @price |
| OrderItem 12_02 | attribute @no |
| OrderItem 12_02 | association <orderedProduct> |
| Product Nr 3003 | attribute @price |

TABLE 5

| Object | ASPECTS |
|---|---|
| David Pond | association <deals> |
| Order #4713 | attribute @status |
| Order #4713 | association <orderedItems> |
| OrderItem 13_01 | attribute @no |
| OrderItem 13_01 | association <orderedProduct> |
| Product Nr 3003 | attribute @price |
| Order #4714 | attribute @date |
| Order #4714 | attribute @status |
| OrderItem 14_01 | attribute @no |
| OrderItem 14_01 | association <orderedProduct> |
| Product Nr 3003 | attribute @price |

In some implementations, the use the above-described query-specific event handlers reduces the quantity of updates and processing associated with adapting to changes at repository 170 and providing those changes to, for example, a user interface for presentation.

In some implementations, SAP Web Dynpro (commercially available from SAP AG, Walldorf, Germany) may be used as a model-based development environment for generating user interface 120, although other development environments may be used as well. The user interface 120 may also be implemented as a business client, such as a Web Dynpro Smart Client or a SAP GUI. The user interface 120 may also have access to one or more services. As used herein, a service represents an application, program, or Web service that may be called. In some implementations, user interface 120 may access and interact with services that are provided by an enterprise services framework, a portal, or any other application or Web service.

The query processor 180 may be implemented as a program or component, i.e., a small binary object (e.g., an applet) or program that performs a specific function and is designed in such a way to operate easily with other components and applications, such as user interface 120. The query processor 180 may perform one or more functions including: receiving a query; determining, based on the received query, objects and aspects; registering objects and aspects with one or more event handlers to monitor the objects and aspects; processing a query; processing the query, when an event handler indicates a change to the objects and aspects; registering other event handlers, when an event handlers indicates a change. Moreover, although query processor 180 is depicted in server system 130, query processor 180 may be located anywhere and distributed in multiple locations. For example, query processor 180 may be implemented as a service, such as a Web service or enterprise service (e.g., SAP's Enterprise Services Framework).

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

Although the description above refers to a client and a server, other frameworks and architectures may be used as well. For example, the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components.

As used herein, the term "user" may refer to any entity including a person or a computer.

The foregoing description is intended to illustrate but not to limit the scope of the invention, which is defined by the scope of the appended claims. Other embodiments are within the scope of the following claims.

What is claimed is:

1. A machine readable storage device containing instructions, that when executed by one or more processors, cause the one or more processors to perform operations comprising:
   receiving, from a user interface at a server system comprising one or more processors and a repository, a plurality of queries that comprises a first query and one or more second queries;
   determining a first query result based on the first query, the first query result comprising an object in the repository and one or more aspects of the object, the one or more aspects comprising one or more of an association and an attribute of the object;
   providing the first query result and one or more second query results for the second queries for display in the user interface;
   registering one or more first query-specific event handlers, each of the one or more first query-specific event handlers being associated with and monitoring at least one of the object and the one or more aspects in the query result;
   updating the first query result when at least one of the first event handlers detects a change in the repository that affects at least one of the object and the one or more aspects in the first query result, the updating comprising providing an updated first query result to the user interface to replace the first query result without affecting the provided one or more second query results of the one or more second queries, the updated first query result comprising one or more updated objects and one or more updated aspects of the one or more updated objects; and
   registering one or more other event handlers in response to detection of the change in the repository by the at least one of the first event handlers, the other event handlers being associated with and monitoring the one or more updated objects and the one or more updated aspects of the one or more updated objects.

2. The machine readable storage device of claim 1 wherein receiving further comprises:
   receiving the first query as a message and implementing the first query using SQL (Structured Query Language) or XQuery.

3. The machine readable storage device of claim 1 wherein determining the object and the one or more aspects further comprises:
   implementing the object as one or more business objects; and
   identifying, by parsing the first query, one or more of the following: a business object, an association among business objects, and an attribute of the business object.

4. The machine readable storage device of claim 1 wherein the server system comprises
   objects implemented as business objects.

5. The machine readable storage device of claim 1 wherein registering the one or more first query-specific event handlers further comprises:
   registering a corresponding event handler as a callback interface at the repository.

6. The machine readable storage device of claim 1 wherein updating the first query further comprises:
   indicating the change by calling the user interface to enable the user interface to resend the first query.

7. The machine readable storage device of claim 1 wherein registering the one or more other event handlers further comprises:
   discarding the one or more first query-specific event handlers, when at least one of the first query-specific event handlers indicates the change.

8. A computer-implemented method comprising:
   receiving a query at a processor;
   determining, based on the received query, one or more objects and one or more aspects of the objects;
   registering the one or more objects and the one or more aspects of the objects with one or more event handlers to monitor at least one of the objects and the aspects;
   evaluating the received query, when at least one of the event handlers indicates a change to at least one of the objects and the aspects;
   providing a result of the received query based on the evaluation; and
   registering other event handlers, when at least one of the event handlers indicates the change.

9. The computer-implemented method of claim 8 wherein receiving further comprises:
   receiving the query as a message and implementing the query using SQL (Structured Query Language) or XQuery.

10. The computer-implemented method of claim 8 wherein determining the one or more objects and the one or more aspects further comprises:
    implementing the one or more objects as a business objects; and
    identifying, by parsing the query, one or more of the following: a business object, an association among business objects, and an attribute of the business object.

11. The computer-implemented method of claim 8 wherein registering the one or more event handlers further comprises:
    registering the one or more event handlers at a server receiving the query, the server including objects implemented as business objects.

12. The computer-implemented method of claim 8 wherein registering the one or more event handlers further comprises:
    registering a corresponding event handler as a callback interface at a the repository including the objects.

13. The computer-implemented method of claim 8 wherein evaluating the received query further comprises:
    indicating the change by calling a user interface to enable the user interface to resend the first query.

14. The computer-implemented method of claim 8 wherein registering other event handlers further comprises:
   discarding the one or more event handlers, when at least one of the event handlers indicates the change.

15. A system comprising:
   a processor; and
   a memory that comprises a repository, wherein the processor and the memory are configured to perform a method comprising:
      receiving, from a user interface, a plurality of queries that comprises a first query and one or more second queries;
      determining a first query result based on the first query, the first query result comprising an object in the repository and one or more aspects of the object, the one or more aspects comprising one or more of an association and an attribute of the object;
      providing the first query result and one or more second query results for the second queries for display in the user interface;
      registering one or more first query-specific event handlers, each of the one or more first query-specific event handlers being associated with and monitoring at least one of the object and the one or more aspects in the query result;
      updating the first query result when at least one of the first event handlers detects a change in the repository that affects at least one of the object and the one or more aspects in the first query result, the updating comprising providing an updated first query result to the user interface to replace the first query result without affecting the provided one or more second query results of the one or more second queries, the updated first query result comprising one or more updated objects and one or more updated aspects of the one or more updated objects; and
      registering one or more other event handlers in response to detection of the change in the repository by the at least one of the first event handlers, the other event handlers being associated with and monitoring the one or more updated objects and the one or more updated aspects of the one or more updated objects.

16. The system of claim 15 wherein receiving further comprises:
   receiving the first query as a message and implementing the query using SQL (Structured Query Language) or XQuery.

17. The system of claim 15 wherein determining the object and the one or more aspects further comprises:
   implementing the object as one or more business objects; and
   identifying, by parsing the first query, one or more of the following: a business object, an association among business objects, and an attribute of the business object.

18. The system of claim 15 wherein the repository further comprises:
   objects implemented as business objects.

* * * * *